(No Model.)

C. F. BRUSH.
SECONDARY BATTERY.

Patented Mar. 2, 1886.

(No Model.) 2 Sheets—Sheet 2.
C. F. BRUSH.
SECONDARY BATTERY.
No. 337,299. Patented Mar. 2, 1886.
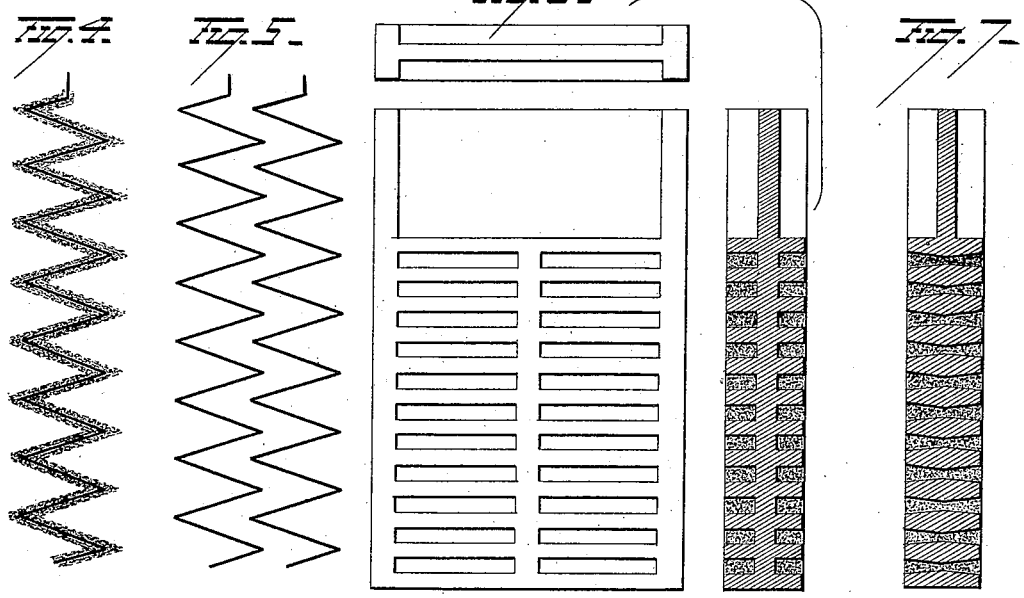
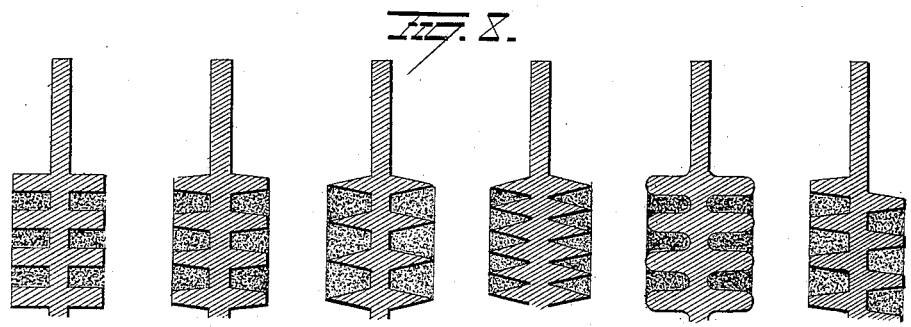
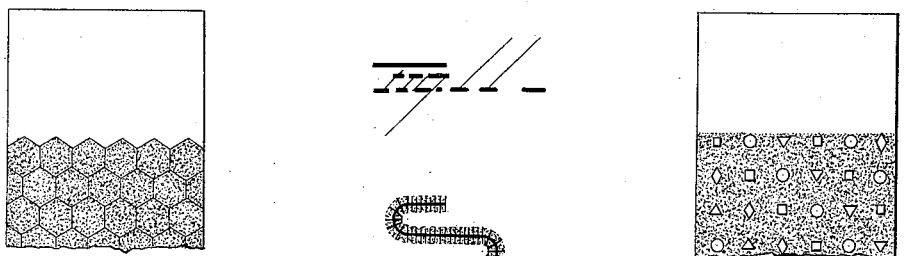
WITNESSES
G. F. Downing
S. G. Nottingham
INVENTOR
C. F. Brush
By Leggett and Leggett
Attorney

UNITED STATES PATENT OFFICE.

CHARLES F. BRUSH, OF CLEVELAND, OHIO.

SECONDARY BATTERY.

SPECIFICATION forming part of Letters Patent No. 337,299, dated March 2, 1886.

Application filed June 13, 1881. Serial No. 35,568. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use it, reference being had to the accompanying drawings, which form part of this specification.

My invention, which for reference and distinction from other similar inventions covered by applications filed but a few days previous hereto, I shall distinguish as "Case J," relates to secondary batteries or current-storing apparatus; and it consists in a secondary-battery element or electrode composed of a suitable plate or support primarily coated or combined with active material.

The invention further consists in the method of constructing secondary-battery elements or electrodes by mechanically coating or combining suitable plates or supports with active material.

In the accompanying drawings, Figure 1 is a vertical end or edge section of a plain plate prepared or coated according to this invention. Fig. 2 shows a corrugated plate; Fig. 3, a ribbed plate. Fig. 4 is an angularly-corrugated plate. Fig. 5 shows two corrugated plates, the ribs on one plate entering the grooves or depressions of the other. Fig. 6 is a top plan and section view of a ribbed plate. Fig. 7 shows a vertical section of a ribbed plate provided with slots or perforations extending through the plate. Fig. 8 represents different forms of ribbed plates. Fig. 9 shows a honey-combed plate. Fig. 10 illustrates a studded plate, and Fig. 11 shows a ribbed corrugated plate.

In Fig. 1, *a* is a plain plate of lead or other suitable metal. *b* is a sheet of heavy paper or card-board or of cloth or felt or equivalent substance, between which and the plate *a* is the coating of lead oxide—the active material—which is represented by the dotted space. The paper or felt is used to retain the lead oxide in position, and is secured to the plate in any suitable manner, as by ties, rivets, or binding-strips of metal or wood. (Not shown.) The lead oxide, if a moderate quantity only is used, may be spread on the plate placed in a horizontal position for this purpose, and consolidated and made to adhere to the plate by placing the whole between two plates of iron and applying pressure by hydraulic or other means. When thus applied to a plate, the oxide will maintain its position without the paper or felt *b*, and will also be found more efficient in use. Both sides of the plate may be treated with lead oxide.

Figure 1:
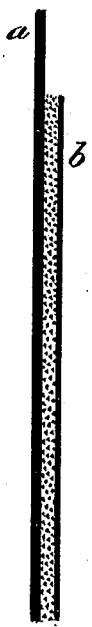
Figure 2:
Fig. 2 shows a corrugated plate having its corrugations filled with the lead oxide. Paper or felt may here be used, as before, to retain the oxide in place; but if the latter is rammed or pressed into the corrugations this support will be found unnecessary.
Figure 3:
Fig. 3 represents a ribbed plate treated with lead oxide in the same manner as has been described in connection with the corrugated plate.

Figs. 4, 5, 6, and 7 illustrate different forms of ribbed plates having active material mechanically applied thereto.

Fig. 8 represents a perforated plate, Fig. 9 a honey-combed plate, Fig. 10 a studded plate, and Fig. 11 a ribbed corrugated plate, all of which have active material primarily and mechanically applied thereto or combined therewith.

Large plain plates or even corrugated and ribbed plates, after being treated with lead oxide, may be separated by sheets of porous non-conducting material or by a sufficient number of strips of non-conducting material and then rolled up into a "cylindrical spiral" form.

Peroxide is the best oxide of lead to use in the preparation of the plates; but as this is rather expensive to prepare red lead or minium may be used. Some sulphate of lead is liable to be formed when this oxide of lead is employed, by the action of the sulphuric acid of the battery on it before peroxidation or reduction is effected. Protoxide of lead or litharge may also be used, but is objectionable, on account of the large quantity of sulphate of lead which is unavoidably produced by the action of the acid on it.

When a pair of plates such as I have described are associated together to form a secondary battery and immersed in dilute sulphuric acid and charged by the passage of an electric current in the usual manner, one of the plates has its coating peroxidized, if a lower oxide of lead was employed for the coating, and forms the oxygen element of the battery, while the other plate has its coating of oxide reduced to the metallic state and then absorbs hydrogen, thus constituting the hydrogen element of the battery.

I would have it understood that I do not restrict myself to any particular form of active or absorptive material or to any particular method of applying it to or combining it with the plate or support, as my invention consists, broadly, in a secondary-battery plate or element having active or absorptive material primarily and mechanically applied thereto or combined therewith, as contradistinguished from a plate of element having the active material produced by the disintegrating action of electricity, as in the well-known Planté process.

Having fully described my invention, what I claim as new, and desire to secure by Letters Patent, is—

1. A secondary-battery element or electrode consisting of a plate or suitable support primarily coated or combined with mechanically-applied active material or material adapted to become active, substantially as set forth.

2. In a secondary battery, an electrode consisting of a plate or support provided with a coating or surface layer of an absorptive substance, such as metallic oxide, applied thereto, substantially as set forth.

3. A plate or suitable support primarily coated or combined with mechanically-applied oxide of lead or equivalent lead compound, substantially as set forth.

4. A plate or suitable support corrugated and primarily coated or combined with mechanically-applied active material or material adapted to become active, substantially as set forth.

5. A plate or suitable support corrugated and primarily coated or combined with mechanically-applied oxide of lead or equivalent lead compound, substantially as set forth.

6. A plate or suitable support provided with grooves, perforations, or receptacles and primarily coated, combined, or filled with mechanically-applied active material or material adapted to become active, substantially as set forth.

7. A plate or suitable support provided with grooves, perforations, or receptacles, and primarily coated, combined, or filled with mechanically-applied oxide of lead or equivalent lead compound, substantially as set forth.

8. The combination, in a secondary battery, of a plate, $a$, coated or combined with mechanically-applied active or absorptive material, and the retaining cover or sheet $b$, of suitable porous material, substantially as set forth.

9. The combination, with the plate or support of an electrode and an active spongy layer thereon, of a porous medium for holding said layer on the plate or support of the electrode, substantially as set forth.

10. An electrode for secondary batteries, comprising a support, an active spongy layer, and a holding medium through which the battery-fluids may pass, adapted to hold the layer on its support, the support, layer or coating, and holding medium being all fastened together so as to be capable of transportation, substantially as set forth.

11. In the construction of secondary battery elements or electrodes, a plate or suitable support primarily coated or combined with mechanically-applied red lead, substantially as set forth.

12. The method of making plates or electrodes for secondary batteries, consisting in primarily combining active material with suitable plates or supports mechanically, in contradistinction to forming the active material by an electrical disintegration of the plate or support, substantially as set forth.

13. The method of making plates or electrodes for secondary batteries, consisting in coating the plates or supports with red lead prior to their immersion in the battery-fluid, substantially as set forth.

14. Active material for secondary batteries, formed into a coherent mass by pressure, substantially as set forth.

In testimony whereof I have signed my name to this specification in the presence of two subscribing witnesses.

CHARLES F. BRUSH.

Witnesses:
JNO. CROWELL, Jr.,
ALBERT E. LYNCH.